United States Patent [19]

Anello

[11] 4,195,310

[45] Mar. 25, 1980

[54] KINESCOPE DRIVE SYSTEM FOR DISPLAYING AUDIO SIGNALS

[75] Inventor: John L. Anello, Auburn, Calif.

[73] Assignee: Phastek, Auburn, Calif.

[21] Appl. No.: 923,826

[22] Filed: Jul. 12, 1978

[51] Int. Cl.² .............................................. H04N 9/02
[52] U.S. Cl. ..................................................... 358/81
[58] Field of Search .................................. 358/81, 82

[56] References Cited

U.S. PATENT DOCUMENTS

| | | | |
|---|---|---|---|
| 3,604,852 | 9/1971 | Weintraub | 358/82 |
| 4,001,880 | 1/1977 | Delikat | 358/82 |
| 4,068,262 | 1/1978 | Sandler et al. | 358/82 |
| 4,074,309 | 2/1978 | Wynn-Smith | 358/82 |
| 4,135,203 | 1/1979 | Friedman | 358/81 |

*Primary Examiner*—Richard Murray
*Attorney, Agent, or Firm*—William Michael Hynes

[57] ABSTRACT

An audio signal is connected to one of two orthogonal deflection means on a kinescope and the audio signal phase shifted by 90 degrees is connected to the other deflection means. The phase shift device shifts the phase by 90° at one or more given frequencies and by different amounts at frequencies other than the given frequencies so that the shape of the pattern produced on the kinescope varies with spectral content of input signal. The phase shift device is adjustable to permit selection of the given frequency at which 90° phase shift occurs. A brightness control circuit responds to the audio signal so that the brightness varies with the magnitude of the audio signal. A cathode beam control circuit for blanking the kinescope trace at a rate determined by the amplitude of the audio signal or at a rate determined by an internal osciallator. A counter circuit for use with a tri-color kinescope which switches the three cathode circuits on and off to afford color variation to the pattern.

5 Claims, 5 Drawing Figures

KINESCOPE DRIVE SYSTEM FOR DISPLAYING AUDIO SIGNALS

BACKGROUND OF THE INVENTION

1. Field of the Invention

This invention relates to a kinescope drive system for producing an aesthetic pattern that varies with an audio signal so as to provide variation of the pattern with the spectral content and amplitude of the signal.

2. Description of the Prior Art

U.S. Pat. No. 2,804,500 and 3,604,852 (79-1) disclose devices employing a color kinescope and circuitry which divides an incoming audio signal into different frequency bands and applies such bands to the electrodes of the kinescope.

U.S. Pat. Nos. 3,742,125 (175-5.2) and 3,811,113 (340-172.5) each discloses a color kinescope and circuitry for generating a pattern which has no relation to an incoming audio signal.

U.S. Pat. No. 2,500,646 (179-1) discloses a kinescope drive system which divides an incoming audio signal into a low frequency component and a high frequency component and applies such components to the electrodes of a cathode ray tube in order to represent a discrete speech sound in an individual or distinctive visual pattern.

SUMMARY OF THE INVENTION

According to the present invention an audio source, such as a musical rendition, is amplified and connected to one of two orthogonal deflection coils of a kinescope. The audio signal is also connected through a phase shift network to the other deflection coil. The phase shift network operates to effect a 90° phase shift at one or more given frequencies, thereby producing a symmetrical pattern on the kinescope at the given frequencies. Parts of the audio signal at frequencies other than the given frequencies will be phase shifted by amounts greater or less than 90° so that portions of the kinescope pattern will be nonsymmetrical. The frequencies at which the phase shifting circuit shifts the signal exactly 90° are adjustable so as to give the user of the device the ability to select the type of pattern that is most pleasing based on the nature or spectral content of the audio material fed to the device.

A system embodying the invention also includes a network for varying the brightness of the kinescope display in accordance with the magnitude of the audio signal. One circuit for achieving this mode of operation is a transistor amplifier coupled to the cathode circuit or its associated grid to vary the beam magnitude in accordance with the signal amplitude. Another circuit, which produces particularly pleasing effects on a color kinescope includes gates for each of the three cathodes and/or control grids and means for switching on one or more of the gates in sequence at a rate dictated by the magnitude of the incoming audio signal or at a rate dictated by an internal oscillator.

The circuitry of the invention does not interfere with the normal operation of a television receiver and includes switching means for disabling the circuit when ordinary use of the receiver is desired. Alternatively, a circuit embodying the invention can be connected to the antenna terminals of the receiver without any alteration of the receiver circuits.

DETAILED DESCRIPTION OF A PREFERRED EMBODIMENT

Figure 1:
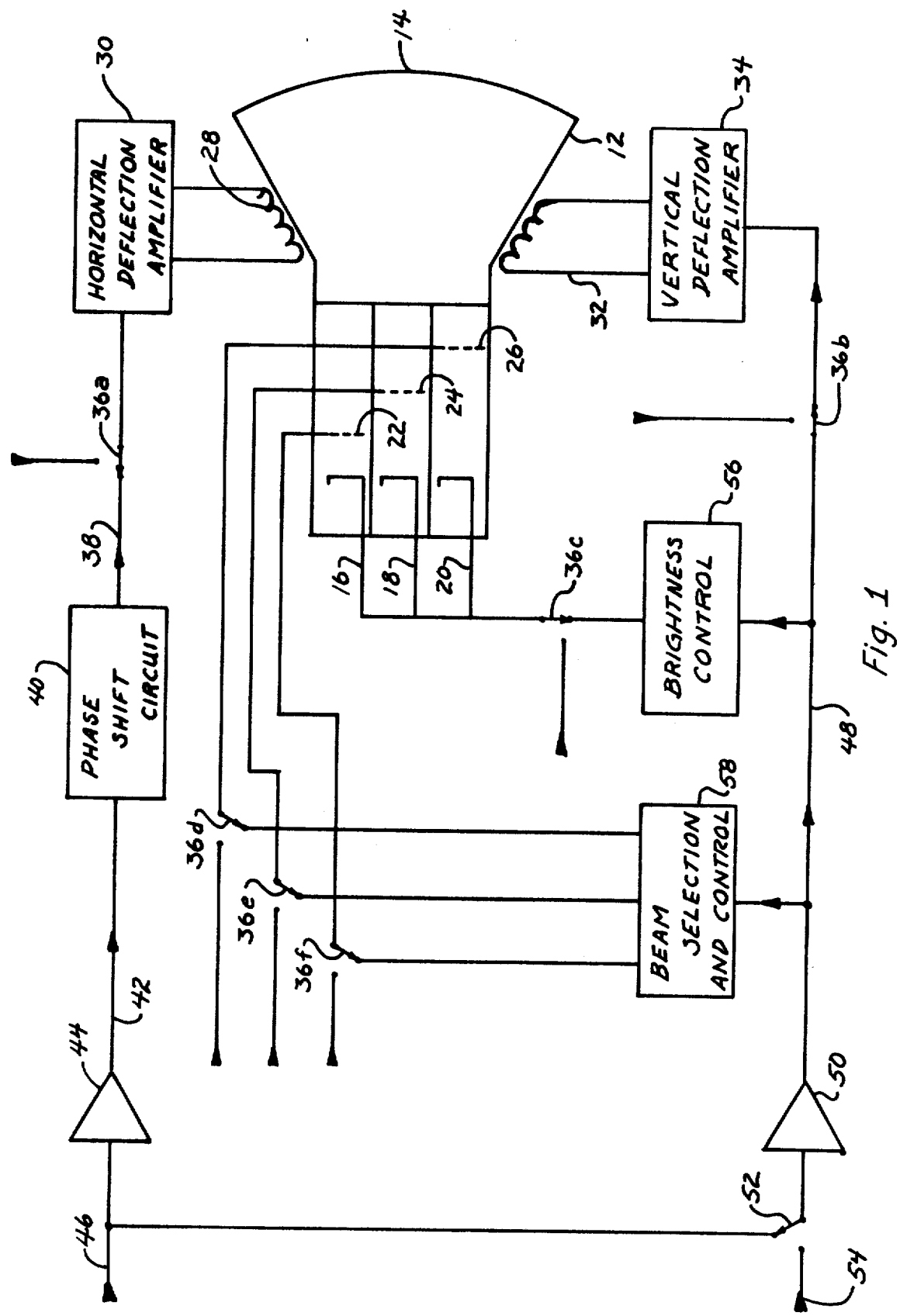
FIG. 1 is a block diagram of a circuit embodying the present invention.

Referring more particularly to the drawings, reference numeral 12 indicates a kinescope which has a screen 14 on which is coated a layer of suitable phosphors. When the phosphors are excited by an electron beam, an image is produced on screen 14. For exciting the phosphors there are three cathodes 16, 18 and 20 which produce electron beams for impingement on screen 14, control grids 22, 24 and 26 being provided for controlling or modulating the respective beams. Associated with kinescope 12 are a horizontal deflection coil 28 which is driven by a horizontal deflection amplifier 30 and a vertical deflection coil 32 which is driven by a vertical deflection amplifier 34 so as to afford deflection of the beams in orthogonal directions in order to controllably excite any portion of screen 14 that may be desired.

The elements described up to this point are elements found in any conventional color television receiver. The invention can be incorporated into such receiver by employment of ganged switches 36a, 36b, 36c, 36d, 36e and 36f. As shown in FIG. 1, switches 36a-36f are in a position to connect kinescope 12 to a circuit embodying the invention; in the opposite position from that shown the switch connects the kinescope to existing circuit outputs of a television receiver.

Deflection coil 28 and deflection amplifier 30 are connected through switch 36a and a circuit path 38 to the output of a phase shift circuit 40. As will appear hereinafter, phase shift 40 effects a phase shift to the signal supplied thereto, the frequency or frequencies at which 90° phase shift occurs being adjustable. The input of phase shift circuit 40 is coupled on a circuit path 42 to an audio amplifier 44, the input of which is an audio source, for example, recorded music connected to an input terminal 46.

Deflection coil 32 and deflection amplifier 34 are connected through switch 36b and a circuit path 48 to the output of an audio amplifier 50. The input of audio amplifier 50 has a switch 52 for affording connection to input terminal 46 or a second audio input terminal 54. When switch 52 is in a position to connect input terminal 54 to amplifier 50, each input is handled as a separate source thereby providing individual inputs to amplifiers 44 and 50 as might be desired for inputting a stereophonic source to the system.

Cathodes 16, 18 and 20 are connected through switch 36c to a brightness control circuit 56 the input to which is connected to circuit path 48. As will appear from the detailed description of brightness control circuit 56, the amplitude of the beam produced by the cathodes can be varied in accordance with the magnitude of the incoming signal.

Control grids 22, 24 and 26 are connected through switches 36d, 36e and 36f, respectively, to the output of a beam selection and control circuit 58 which will be explained hereinafter in connection with FIG. 3.

Figure 2:
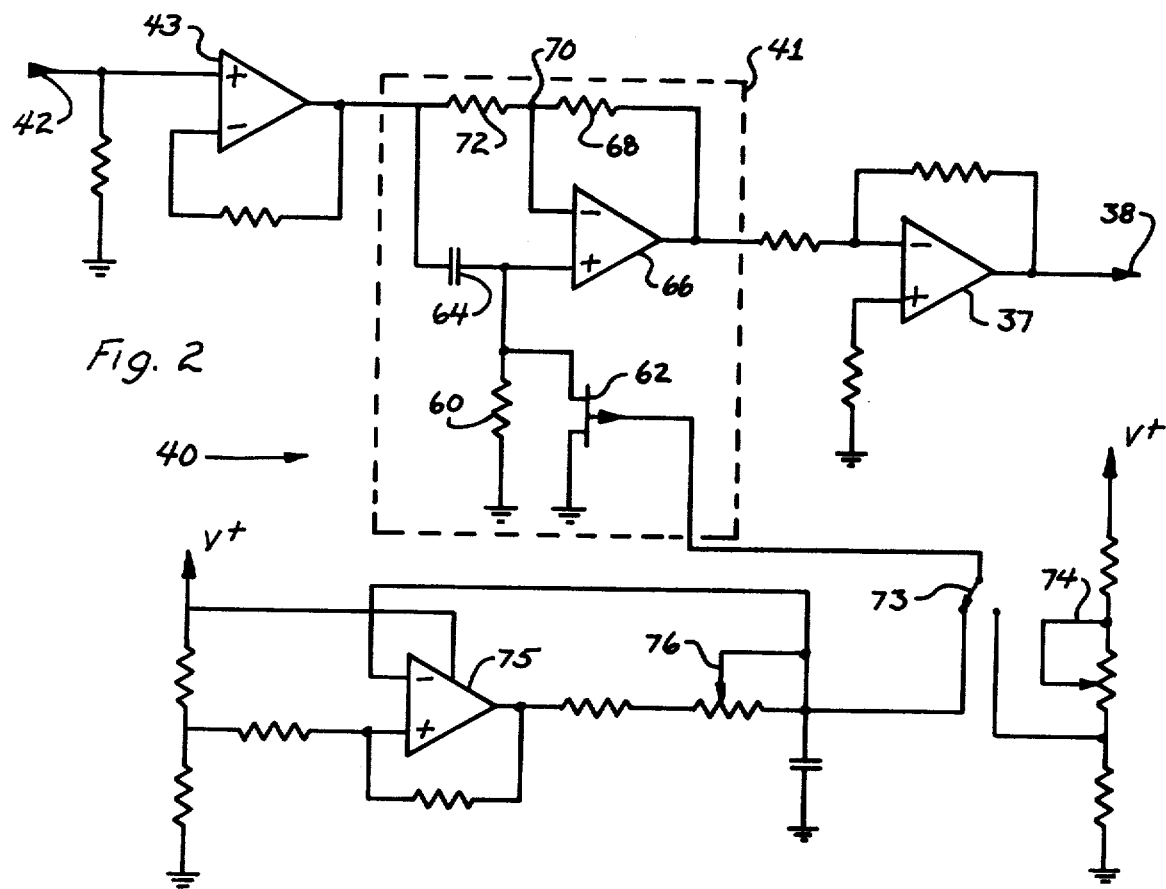
FIG. 2 is a schematic diagram showing in greater detail a suitable form of the phase shift circuitry.

With reference to FIG. 2, phase shift circuit 40 operates to shift audio signals received on circuit path 42 by 90° and deliver such phase shifted signal to circuit path 38. Operational amplifiers 43 and 37 serve respectively as input and output buffers. The phase shift network 41 is constructed and arranged to effect 90° phase shift at one specific audio frequency, frequencies different from the specific frequency being shifted by amounts greater or less than 90°. Two or more of the phase shift networks 41 can be connected in series, with the specific frequency at which 90° phase shift occurs being different for each of the networks. The phase shift circuit includes a fixed resistor 60, an FET transistor 62 in shunt therewith, and a series capacitor 64 which form a simple phase lead circuit with the output across the parallel combination of resistor 60 and FET transistor 62 being applied to the reference input of an operational amplifier 66. The voltage at such input will lead the input voltage on circuit path 42 by 45° when the capacitive reactance or capacitor 64 is equal to the total resistance of resistor 60 and FET transistor 62 at a frequency, $f=1/(2\pi R\ C)$ in which R is equal to the resistance of the parallel combination of resistor 60 and FET transistor 62, and C is the capacitance of capacitor 64. The output of operational amplifier 66 is fed back through a resistor 68 to a summing point 70. Summing point 70 is connected to the other input of operational amplifier 66 and to circuit path 42 through a resistor 72 which has a resistance equal to that of resistor 68. Thus, the output on circuit path 38 will be twice the phase angle at summing point 70 and will have an amplitude equal to that of the input voltage supplied on circuit path 42. Varying the resistance of FET transistor 62 changes the frequency at which a 90° phase shift is achieved, the same effect being obtainable by affording variability to resistor 60 and/or capacitor 64. The range of variability of FET transistor 62 is chosen so that a 90° phase shift can be achieved over a wide band of frequencies within the audio spectrum. By using additional networks 41, the entire audio spectrum can be covered.

The gate terminal of FET transistor 62 is connected to the moving contact of a switch 73 which has right and left fixed contacts. The right fixed contact is connected to a voltage divider that includes a variable resistor 74. When the moving contact of switch 73 is connected to the right fixed contact, variation of resistor 74 effects variation of the resistance of FET transistor 62 which in turn alters the frequency at which phase shift circuit 40 shifts the phase of the audio input signal by 90°.

The left fixed contact of switch 73 is connected to the output of a ramp generator formed by an operational amplifier 75. The ramp generator produces a triangular wave at a frequency determined by a variable resistor 76. In one system designed in accordance with the invention, the frequency of the triangular wave can be varied between about 0.5 Hz and about 5 Hz. When the moving contact of switch 73 is connected to the left fixed contact, the ramp generator continuously varies the resistance of FET transistor 62, which in turn continuously varies the frequency of 90° phase shift of phase shift circuit 40. This produces an image on screen 14 that, in addition to varying with the magnitude and spectral content of the incoming audio signal, varies slowly in accordance with frequency output of the ramp generator as established by the setting of variable resistor 76.

Figure 3:
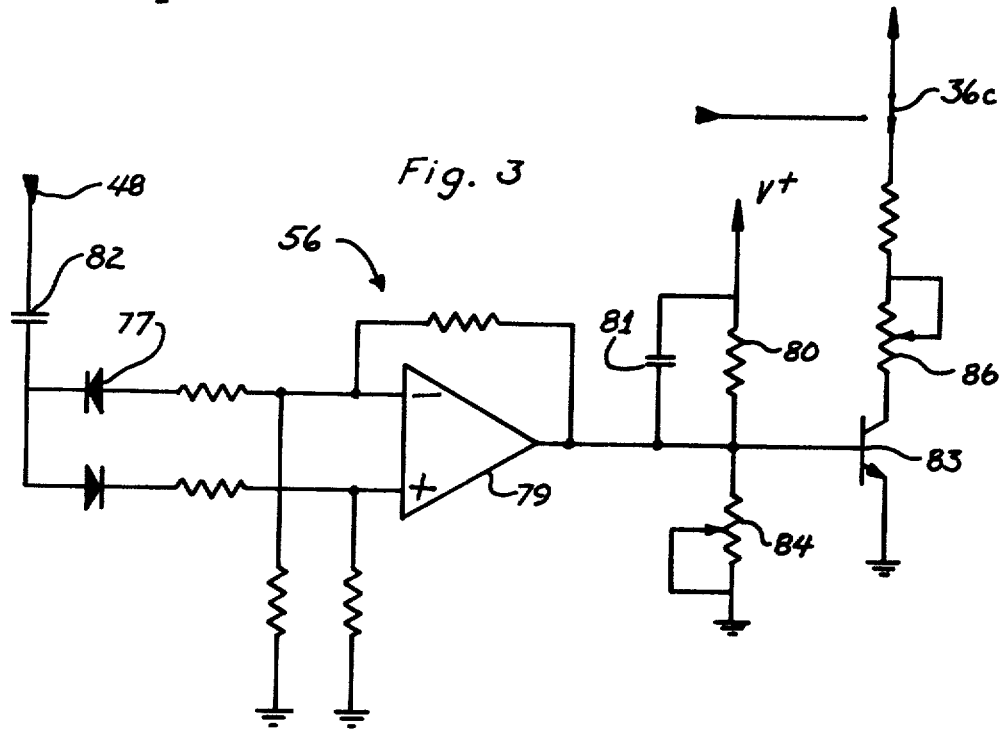
FIG. 3 is a schematic diagram showing one form of brightness control circuitry of the invention.

Referring to FIG. 3, brightness control circuit 56 receives an input on circuit path 48. Such input is supplied through input capacitor 82 to two oppositely poled diodes 77 and 78 to the respective inputs of an operational amplifier 79 which form, in conjunction with a resistor 80 and a parallel capacitor 81, an envelope detector that produces a DC voltage indicative of the average value of the audio input signal. Such DC voltage is connected to the base of a transistor 83. A variable resistor 84 affords variable bias to transistor 83 so as to provide an adjustment of circuit sensitivity to the amplitude of the incoming audio signal. The collector of transistor 83 is connected through a variable resistor 86, which functions as a maximum brightness level set, and switch contacts 36c to cathodes 16, 18 and 20. Thus, transistor 83 functions as a variable resistor and modulates cathode current as a function of the input magnitude signal so that the brightness of the image produced on screen 14 is a function of the amplitude of the audio input signal.

Figure 4:
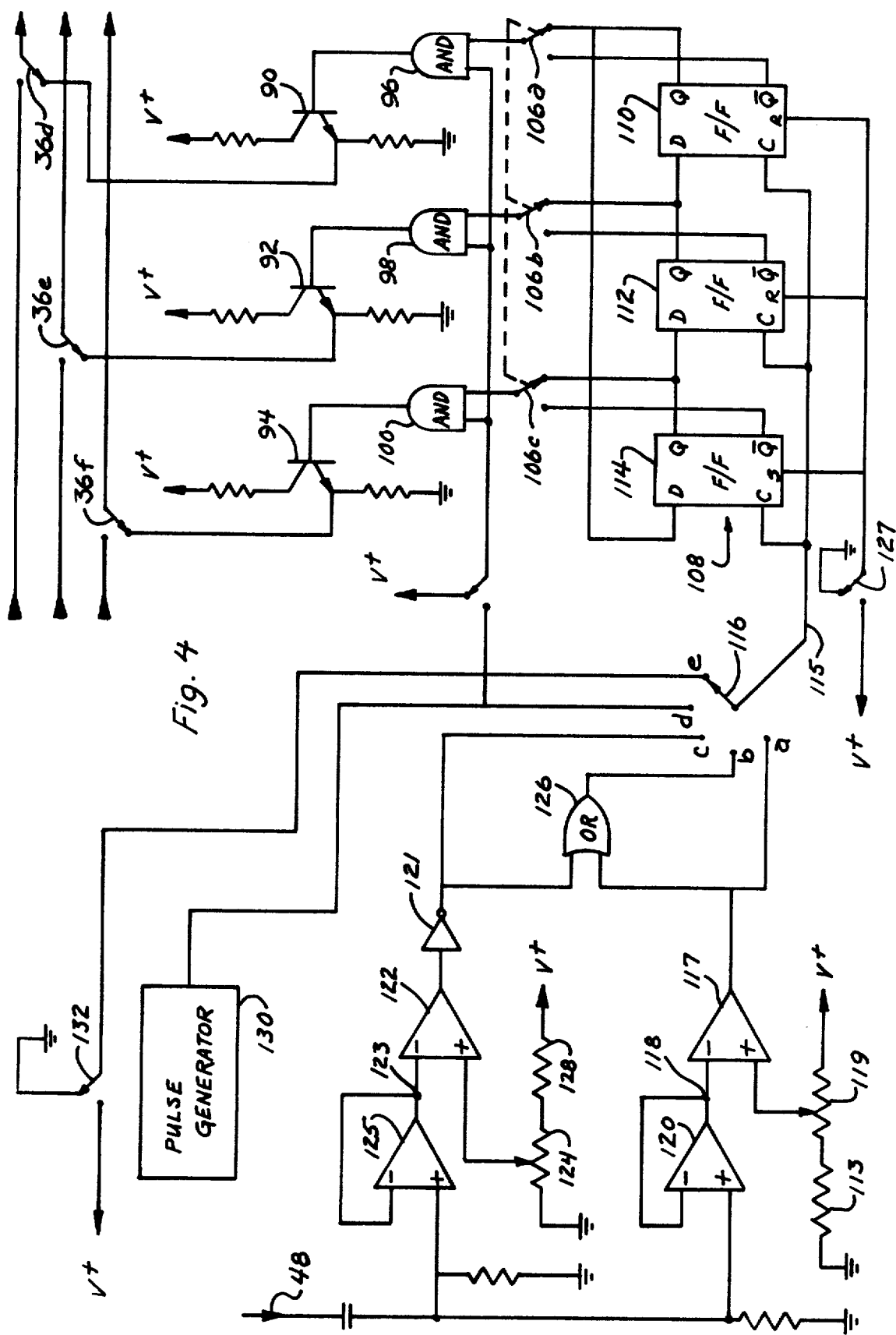
FIG. 4 is a block diagram of a circuit for gating the cathode/grid circuits of a three gun kinescope so as to produce color switched aesthetic patterns in response to an incoming audio signal.

Referring to FIG. 4, the upper fixed contacts associated with switches 36d, 36e and 36f are connected to respective emitter followers 90, 92 and 94 which in turn are driven by the outputs of respective AND gates 96, 98 and 100. Thus, with switches 36d, 36e and 36f in the position shown in FIGS. 1 and 4, the degree of control of the beams from cathodes 16, 18 and 20 afforded by grids 22, 24 and 26 will be determined by the output of AND gates 96, 98 and 100. The circuitry of FIG. 4 controls the gates in several modes, one of which operates to vary the color of the image produced on screen 14 in accordance with the magnitude or amplitude of the audio signal and another of which operates independently of such magnitude.

With switch 102 in the position shown, the left-hand inputs of AND gates 96, 98 and 100 are connected to the positive voltage supply which provides these inputs with a binary one. In this position the output of the AND gates will reflect the state of flip-flops 110, 112 and 114.

With switch 102 in the opposite position, the outputs of the AND gates will be enabled or disabled in accordance with the signal provided by a pulse generator 130 which is variable in both frequency and pulse width. As a result, the output of the AND gates will be interrupted at regular intervals as determined by the pulse generator, and the trace on screen 14 will be segmented.

The right-hand inputs of the AND gates are connected through respective ganged switches 106a, 106b and 106c to the outputs of flip-flops 110, 112 and 114, respectively. Flip-flops 110, 112 and 114 are connected as a shift register 108 with the output of flip-flop 110 connected back to the input of flip-flop 114. With each clock pulse present at circuit path 115, the register will be clocked and each flip-flop will assume the state of the flip-flop preceding it in the register. Thus, the first clock pulse will set flip-flop 112 and reset flip-flops 110 and 114, the second will set flip-flop 110 and reset 112 and 114, and finally, a third pulse will again set flip-flop 114 and reset flip-flops 110 and 112, returning the register to its original configuration. Additional pulses cause the register to repeat this cycle.

The set or Q outputs of the flip-flops are connected to the right-hand contacts of switch 106. With switch 106 in the position shown, one AND gate at a time is activated and one color at a time is displayed on screen 14. With ganged switch 106 in the opposite position, the reset or $\overline{Q}$ outputs are connected to the AND gates, and two gates at a time are activated providing two colors on the screen 14. The clock inputs of the flip-flops 110–114 are connected in common via a circuit path 115 to the moving contact of a five position switch 116 which has fixed contacts a, b, c, d and e.

In order to preset shift register 108 at the outset of operation, the set input of flip-flop 114 and the reset inputs of flip-flops 110 and 112 are connected through a momentary contact switch 127 to the positive voltage supply of the system, thereby affording connection of a binary 1 to the designated set/reset flip-flop inputs.

Referring again to FIG. 4, switch 116, fixed contact a is connected to the output of a voltage comparator 117. Voltage comparator 117 produces a signal when the voltage level at input terminal 118 thereof exceeds reference voltage established on the other input by a potentiometer 119 and a resistor 113. Voltage to input terminal 118 is received from a buffer amplifier 120 which receives the audio signal transmitted on circuit path 48. Thus, whenever the amplitude of the audio signal supplied on circuit path 48 exceeds a preselected reference value, established by adjustment of the potentiometer 119 and switch 116 is in the "a" position, shift register 108 is advanced and the color on screen 14 changes.

Fixed contact c of switch 116 is connected through an inverter 121 to the output of a voltage comparator 122 which is substantially identical in structure and function to voltage comparator 117. Voltage comparator 122 produces an output signal when the voltage level at input terminal 123 thereof exceeds a reference voltage established on the other input from a potentiometer 124 and resistor 128. Voltage to input terminal 123 is received from a buffer amplifier 125 which receives the audio signal transmitted on circuit path 48. Thus, when switch 116 is in the "c" position and the amplitude of the incoming audio signal exceeds the reference voltage established by potentiometer 124, comparator 122 produces a high output which is inverted to a low output by inverter 121 so as not to clock flip-flops 110–114. When the amplitude of the incoming audio signal falls below the level established by potentiometer 124, however, comparator 122 produces a low output which is inverted by inverter 121 to produce a clock pulse which advances shift register 108 and thereby changes the color on screen 14. Thus, fixed contact c of switch 116 has a clock signal each time the amplitude of the incoming audio signal falls below a reference level whereas fixed contact a has a clock signal each time the amplitude of the incoming audio signal exceeds a reference level.

Fixed contact b of switch 116 is connected to the output of an OR gate 126 which has two inputs connected, respectively, to the outputs of comparator 117 and inverter 121. Thus, fixed contact b has a clock signal each time the amplitude of the incoming signal exceeds a reference level established by potentiometer 119 or falls below a reference level established by potentiometer 124. Thus, the user can operate the system of this invention so that color changes on screen 14 occur in accordance with changes in the amplitude of the incoming signal.

Fixed contact d is connected to the output of pulse generator 130. With switch 116 in position "d" the rate at which the color is changed is determined by the frequency of the pulse generator 130. As stated earlier, the output of pulse generator 130 is frequency variable.

Fixed contact e of switch 116 is connected to ground through a momentary contact switch 132. The other contact of switch 132 is connected to positive supply voltage. Manually operating switch 132 provides the clock pulse necessary to change color when switch 116 is in position "e."

The system of the invention operates as follows: First, switch 36 is operated to disconnect the circuitry associated with kinescope 12 from the normal signal input provided by the television receiver and to connect circuitry incorporating the present invention to the kinescope. Next, a source of audio input, for example, a tape recorder or record player output, is connected to input terminal 46, switch 52 being thrown to the position shown in FIG. 1. An aesthetically pleasing pattern will be produced on screen 14. The overall shape of the pattern will be dictated by the frequency and amplitude of the signals applied to orthogonal deflection coils 28 and 32. The signal applied through phase shift circuit 40 will be shifted so that deflection coil 28 will be correspondingly excited. The signal supplied to coil 32, however, will simply be amplified by amplifier 50 and will not be phase shifted. By varying the frequency at which a phase shift of exactly 90° is achieved by phase shift circuit 40 through control of FET transistor 62 (FIG. 2), the pattern produced on the screen can be made symmetrical about the horizontal and vertical axes of kinescope 12. Control of the parallel resistance afforded by FET transistor 62 can be achieved manually by switching switch 73 to the right and adjusting variable resistor 74 and can be achieved automatically by switching switch 73 to the left so that the resistance of transistor 62 continuously varies in response to the triangular wave produced by the ramp generator. Adjustment of the frequency of ramp generator 75 will vary the rate of change of the symmetry of the pattern displayed, thereby producing a sense of depth in the pattern.

The brightness of the image on screen 14 can be varied in accordance with the amplitude of the input signal by employment of the brightness control circuit 56 shown in FIG. 3. The audio signal supplied on circuit path 48 is converted to a voltage envelope through coaction of diodes 77 and 78, operational amplifier 79, resistors 80 and 84, and capacitor 81 so that the brightness of the image on screen 14 will vary with the amplitude or loudness of the audio input signal. In this mode transistor 83 acts as a variable resistance which varies with the amplitude of the incoming audio signal, and resistor 86 limits the brightness when the resistance of transistor 83 approaches zero in response to a loud incoming audio signal. In addition, transistor 83 is biased such that relatively low input signals will cause complete blanking of the beams. This avoids damage to the phosphors on screen 14 caused by insufficient deflection of the beams. The particular brightness conditions produced by brightness control 56 can be adjusted by adjusting resistor 84 and resistor 86 so as to provide virtually any effect desired by and pleasing to the user.

Control signals on control grids 22, 24 and 26 further enhance the dynamics of the image produced on screen 14 and are particularly striking in the case of a color kinescope as shown in the drawings. Having reference to FIG. 4 with switch 116 in position "b" and all other switches in the position shown in the figure, shift register 108 will activate only one of the control grids at a time whereby the color of the image will change in response to amplitude variations of the incoming audio signal. By adjustment of potentiometers 119 and 124, which adjust the reference voltages applied to voltage comparators 117 and 122, the color of the image on screen 14 can be made to switch at different levels of input, the same being under the control of the user to provide a pattern that changes with the amplitude of the audio in a manner that is pleasing to the viewer. Should a different mode of operation be desired, that is, one in which two of the grids are active and one is blanked out, switch 106 can be thrown to the left-hand position as viewed in FIG. 4 at which position two grids are activated by the $\overline{Q}$ outputs of two flip-flops 110, 112 and 114.

Thus, the colors of the pattern of screen 14 continuously change at a rate that is dictated by the loudness of the incoming audio signal so that the user of the apparatus can enjoy the visual effects displayed on screen 14 along with the aural effects produced by conventional loudspeakers.

Moving switch 116 to the "a" position effects color change only when the amplitude of the incoming audio signal exceeds a reference level established by potentiometer 119. Moving switch 116 to the "c" position effects color change only when the amplitude of the incoming audio signal falls below a reference level established by potentiometer 124. Switch 116 in the "b" position effects color change when the conditions of either position "a" or "c" are met. Moving switch 116 to the "d" position effects color change at a rate dictated by the frequency of pulse generator 130. And finally, moving switch 116 to the "e" position allows for the color to be changed manually.

Further modification of the pattern produced is accomplished by moving switch 102 to the down position. By activating this switch, the character of the trace is changed from a smooth continuous series of lines to a segmented or even dotted trace as determined by the setting of the width and frequency of the pulse produced by pulse generator 130.

Figure 5:
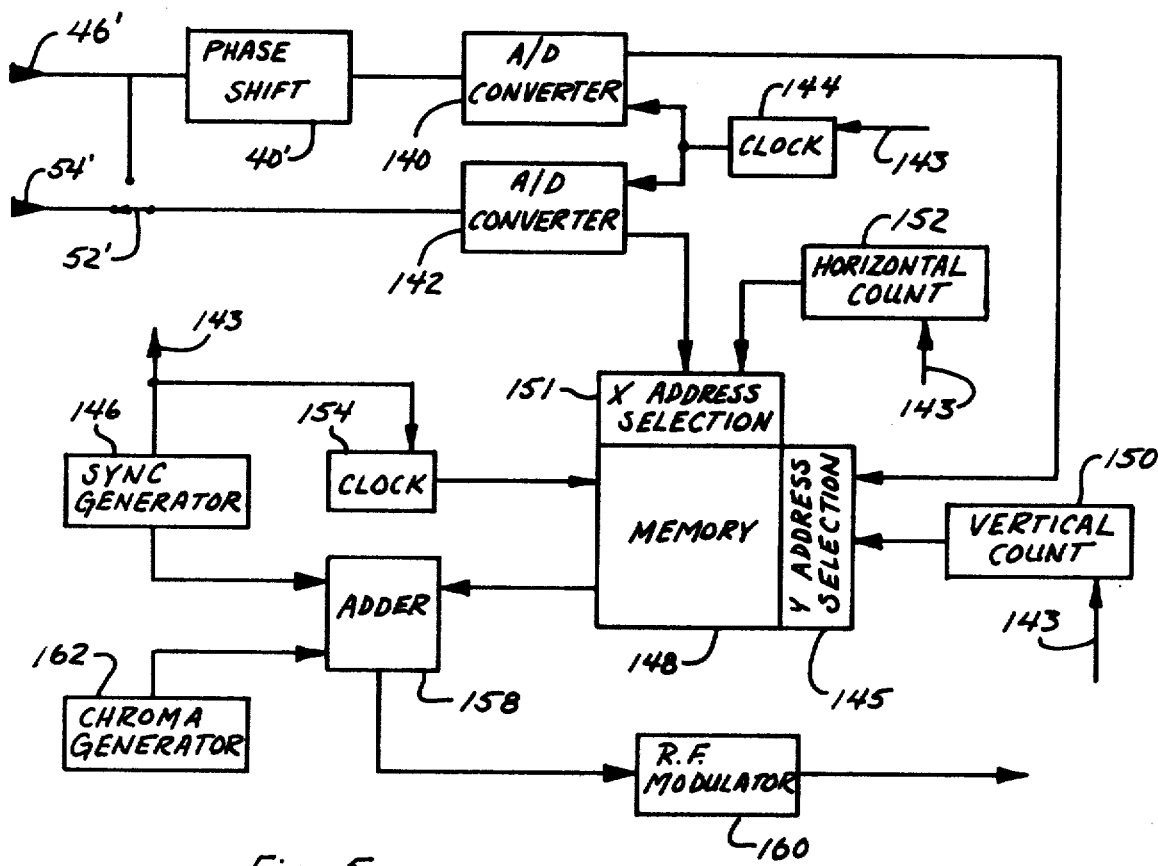
FIG. 5 is a schematic diagram of a circuit which affords coupling of the audio derived signals through the antenna terminals of a television receiver.

The system of the present invention can be employed without any internal modification of the TV receiver by appropriately processing the audio signals and connecting them through the TV antenna terminals. An embodiment for affording this mode of operation is shown in FIG. 5, in which elements that are similar or equivalent to corresponding elements in FIG. 1 bear the same reference numerals with the addition of a prime. Thus, there is an audio input terminal 46' which is connected through a phase shift circuit 40' to an analog-to-digital converter 140. Input 54' is connected through switch 52' directly to analog-to-digital converter 142. Switch 52' allows for use of one or two inputs. The converters 140 and 142 are driven by a clock pulse generator 144, the clock rate of which is established by a sync generator 146 through circuit path 143. Sync generator 146 is constructed to produce sync signals at a rate compatible with sweep and sync rates present in conventional television receivers.

The output of analog-to-digital converter 140 is connected through a vertical address select circuit 145 to a memory 148. The timing of the information stored from analog-to-digital converter 140 is determined by a vertical counting circuit 150 which is synchronized by sync generator 146 through circuit path 143 so that the information is stored in the memory at a rate compatible with the television receiver.

The output of analog-to-digital converter 142 is connected to memory 148 through a horizontal address select circuit 150 which is timed by a horizontal counting circuit 152 in synchronism with the sync generator via circuit path 143 so that the rate at which the data is stored in the memory is likewise compatible with the sweep rates of the television receiver. For properly timing the readout of the information stored in memory 148 there is a read clock 154 also synchronized with pulse generator 146. The information read from memory 148 is connected to an adder 158 so that signals from sync generator 146, a chroma generator 162 which will determine the color of the trace, and the information corresponding to the incoming audio signal is added for use by the sweep circuits of the television receiver. Finally, such combined signal is modulated by an RF modulator 160 onto a carrier having a frequency corresponding to one of the channels on the receiver.

The system of FIG. 5 produces an image on the screen of the TV receiver substantially equivalent to that described above. More particularly, the unshifted audio input signal is digitized by converter 142 and stored in the memory. The audio signal that is phase shifted by phase shift circuit 40' is digitized by converter 140 and is also stored in the memory. The circuit of FIG. 5 affords correct timing and position of the digitized audio information because horizontal and vertical information entering simultaneously is serialized. The timing of the serialized information is correct because it is controlled in synchronism with sync generator 146. The information is stored for readout of one horizontal sweep line at a time so that it can be read out continuously. Proper timing is established by clock 154 to assure compatibility with the receiver circuits. Finally, the information from the memory that is indicative of the audio signals is added to the sync generator signal by adder 158 and is modulated so as to be compatible with the RF and sweep circuitry in the TV receiver. Thus, the system of FIG. 5 achieves the advantages referred to above without requiring permanent modification of the TV receiver with which it is used.

Thus, it will be seen that the present invention provides a kinescope drive system which can be incorporated into existing commercially available color television receivers and which affords to the user added enjoyment and heightened sensitivity to the audio material supplied to the apparatus. The circuitry of the invention is designed for relative simplicity and long life while at the same time affording a high degree of variability or selectivity to enable the user to select a particular mode of operation that is appropriate both to the user's desires and to the nature of the audio material supplied to the device.

Although several embodiments of the invention have been shown and described, it will be obvious that other adaptations and modifications can be made without departing from the true spirit and scope of the invention.

What is claimed is:

1. A system for driving a kinescope in response to an audio signal to produce an aesthetic pattern thereon that varies with the frequency and amplitude of the audio signal, said kinescope being of the type having a screen, a cathode for producing an electron beam for impinging on the screen, and first and second orthogonal deflection means for deflecting the beam to effect excitation of selected regions of the screen, said system comprising means for coupling said audio signal to said first deflection means, phase shifting means for shifting the phase of said audio signal by 90° at a given audio frequency, means coupling the outlet of said phase shifting means to said second deflection means, means for adjusting said given audio frequency within the audio range; means responsive to the amplitude of the audio signal for varying the intensity of the beam produced by said cathode so that the brightness of said pattern varies with the magnitude of said audio signal; and, switch means for alternately producing a first output which activates said cathode and a second output which deactivates said cathode and means responsive to said audio signal for activating said switch in response to the magnitude of said audio signal.

2. A system for driving a color kinescope in response to an audio signal to produce an aesthetic pattern thereon that varies with the frequency and amplitude of the audio signal, said kinescope being of the type having a screen, a cathode for producing an electron beam for impinging on the screen, and first and second orthogonal deflection means for deflecting the beam to effect excitation of selected regions of the screen, said system comprising means for coupling said audio signal to said first deflection means, phase shifting means for shifting the phase of said audio signal by 90° at a given audio frequency, means coupling the output of said phase shifting means to said second deflection means, and means for adjusting said given audio frequency within the audio range, means responsive to the amplitude of the audio signal for varying the intensity of the beam produced by said cathode so that the brightness of said pattern varies with the magnitude of said audio signal, said color kinescope is a color kinescope having a screen with three different phosphors thereon, three cathodes constructed and arranged to excite respective said phosphors, and three control grids for controlling the beams produced by respective said cathodes, said control system including three AND gates having their outputs connected to activate respective said control grids, means for sequentially and selectively enabling said AND gates, and means connecting said audio signal to said gate enabling means for altering the color of the kinescope pattern at intervals dictated by the magnitude of said audio signal.

3. Apparatus according to claim 2 wherein said AND gate enabling means includes a shift register having three output terminals connected to respective said AND gates and being constructed and arranged to connect an enabling system to said outputs in sequence, a comparator for comparing the incoming audio signal with a reference voltage, and means responsive to said comparator for producing a trigger for said shift register each time the audio input signal differs from the reference voltage.

4. Apparatus according to claim 3 wherein trigger producing means includes first and second comparators for generating respective first and second comparators for generating respective first and second pulses in response to the amplitude of the incoming audio signal exceeding respective first and second reference levels, means for inverting said first signal to produce an inverted signal, and means coupling said second signal and said inverted signal to said shift register so as to trigger said shift register when said incoming signal is less than said first reference level and when said incoming signal exceeds said second level.

5. A method for producing an aesthetically pleasing visual pattern that corresponds to and varies with the frequency and amplitude of an audio signal comprising the steps of providing a kinescope having a screen, at least one cathode for producing an electron beam that impinges on the screen and first and second orthogonal deflection means for deflecting the beam to effect excitation of selected regions of the screen, connecting the audio signal to the first deflection means, phase shifting the audio signal by 90° at a given audio frequency and shifting the audio signal by different degrees at frequencies different from the given frequency; connecting the shifted signal to the second deflection means; varying the intensity of the beam produced by said cathode so that the brightness of said pattern varies with said audio signal.

* * * * *